United States Patent
Hamilton et al.

(10) Patent No.: US 10,131,779 B2
(45) Date of Patent: Nov. 20, 2018

(54) BLENDS OF STYRENE-BUTADIENE COPOLYMERS

(71) Applicant: INEOS STYROLUTION GROUP GMBH, Frankfurt (DE)

(72) Inventors: Michael Hamilton, Brownstown, MI (US); Thomas W. Cochran, Channahon, IL (US); Norbert Niessner, Friedelsheim (DE); Konrad Knoll, Mannheim (DE)

(73) Assignee: INEOS STYROLUTION GROUP GMBH (DE)

( * ) Notice: Subject to any disclaimer, the term of this patent is extended or adjusted under 35 U.S.C. 154(b) by 104 days.

(21) Appl. No.: 15/508,355

(22) PCT Filed: Sep. 2, 2015

(86) PCT No.: PCT/EP2015/070004
§ 371 (c)(1),
(2) Date: Mar. 2, 2017

(87) PCT Pub. No.: WO2016/034609
PCT Pub. Date: Mar. 10, 2016

(65) Prior Publication Data
US 2017/0240740 A1    Aug. 24, 2017

(30) Foreign Application Priority Data
Sep. 3, 2014  (EP) ..................................... 14183443

(51) Int. Cl.
C08L 53/02      (2006.01)
C08J 5/18       (2006.01)

(52) U.S. Cl.
CPC ............. C08L 53/02 (2013.01); C08J 5/18 (2013.01); *C08J 2353/02* (2013.01); *C08J 2425/06* (2013.01); *C08J 2453/02* (2013.01); *C08L 2201/10* (2013.01); *C08L 2203/16* (2013.01); *C08L 2205/025* (2013.01); *C08L 2205/035* (2013.01)

(58) Field of Classification Search
CPC ............... C08L 53/02; C08L 2205/035; C08L 2205/025
See application file for complete search history.

(56) References Cited

U.S. PATENT DOCUMENTS

| | | |
|---|---|---|
| 6,177,517 B1 | 1/2001 | Guntherberg et al. |
| 6,197,889 B1 | 3/2001 | Knoll et al. |
| 6,369,160 B1 | 4/2002 | Knoll et al. |
| 6,593,430 B1 | 7/2003 | Knoll et al. |
| 2009/0286918 A1 | 11/2009 | Stewart et al. |
| 2011/0098401 A1 | 4/2011 | Muller et al. |

FOREIGN PATENT DOCUMENTS

| | | |
|---|---|---|
| WO | 96/20248 A1 | 7/1996 |
| WO | 97/40079 A1 | 10/1997 |
| WO | 99/46330 A1 | 9/1999 |
| WO | 00/58380 A1 | 10/2000 |
| WO | 2008/000623 A1 | 1/2008 |
| WO | 2012/055919 A1 | 5/2012 |

OTHER PUBLICATIONS

International Preliminary Report on Patentability in International Application No. PCT/EP2015/070004, dated Aug. 2, 2016.
Robert Huber "SBS-Block Copolymer with Unique Structure and Properties," TPE 2005 8th International Conference, Berlin, Germany, Paper 16, Jan. 2005, pp. 1-12.
Konrad Knoll and Nobert Niessner "Styrolux+ and Styroflex+— From Transparent High Impact Polystyrene to New Thermoplastic Elastomers," Macromol. Symp. 1998,132, pp. 231-243.

*Primary Examiner* — Jeffrey C Mullis
(74) *Attorney, Agent, or Firm* — J.A. Lindeman & Co., PLLC

(57) ABSTRACT

Polymer blend comprising 95 to 100% of a component A) and 0 to 5% of additives, where A) is consisting of polymers A1) to A4): A1) 50 to 75% of a star shaped block copolymer A1 which comprises at least 2 terminal vinylaromatic hard blocks S and diene soft blocks B, where the proportion of the hard blocks S is from 65 to 90%, and Mn of block S is 35000 to 200000; A2) 5 to 15% of block copolymer A2 which comprises 2 terminal vinylaromatic hard blocks S1 and S2 and random copolymer blocks (B/S) consisting of 20 to 60% vinylaromatic monomers, and 80 to 40% dienes where the proportion of blocks S1 and S2 is 40 to 60%; and Mn of blocks S1 is 35000 to 200000, and Mn of blocks S2 is 5000 to 30000 and the molar S1/S2 ratio is 1:0.5 to 1:10; A3) 3 to 10% of an block copolymer A3 built up from vinylaromatic hard blocks S and from random soft blocks B/S consisting of 60 to 30% vinylaromatic monomers and 40 to 70% dienes, where the diene content is less than 50% and the proportion of the soft phase is at least 60%; and A4) 10 to 35% polystyrene A4; whereby the ratio of A1) to A2) to A3) is from 7 : [1.2 to 1.9] : [0.5 to 12], have particular mechanical properties.

16 Claims, No Drawings

BLENDS OF STYRENE-BUTADIENE COPOLYMERS

The invention relates to a polymer blend comprising polystyrene, rubber-elastic and different tough-stiff block copolymers, the process for preparing such blend and its use.

Document WO 2008/000623 discloses mixtures of highly transparent styrene-butadiene block copolymers A and tough-stiff styrene-butadiene block copolymers B with polystyrene and their use for transparent thermoforming foils or transparent injection-molded items. Preferably block copolymer A is star shaped and comprises terminal vinylaromatic hard blocks S and a diene soft block $B_A$, where the proportion by weight of the hard blocks S in the block copolymer A is from 65 to 90% by weight. Block co-polymer B preferably is a linear or particular preferred star shaped block copolymer with at least 2 terminal vinylaromatic hard blocks S1 and S2 of different molecular weight and a random diene/ vinyl aromatic copolymer soft block $(B/S)_B$, where the pro-portion by weight of the hard blocks S in the block copolymer B is from 40 to 60% by weight. The mixture comprises 25 to 75 wt.-% of a block copolymer A, 5 to 25 wt.-% of a block copolymer B and 0 to 70 wt.-% polystyrene or a block copolymer C other than A and B which is not further specified or exemplified.

Document WO 99/46330 describes transparent ternary polymer mixtures comprising P1) an elastomeric styrene-butadiene block copolymer which has been built up from styrene hard blocks S and from random butadiene/ styrene copolymer soft blocks B/S, and which contains at least the block structure S-B/S-S, where the diene content is less than 50 percent by weight and the proportion of the soft phase formed from the blocks B/S is at least 60 percent by weight, based in each case on the entire block copolymer, P2) a tough and stiff styrene-butadiene block copolymer, preferably a star shaped block copolymer with terminal styrene hard blocks S, with a butadiene content in the range from 5 to 40% by weight and from 60 to 95% by weight of styrene, based on the entire block copolymer P2), and P3) glass-clear and/or impact-modified polystyrene.

Shaped articles and films are prepared from ternary blends made from:
P1) a linear rubber elastic block copolymer,
P2) Styrolux 693 D or Styrolux 684 D, each star shaped block copolymers with terminal styrene hard blocks and a styrene comprising middle block BIS, with 25 wt.-% butadiene, based on the entire block copolymer P2), and
P3) polystyrene (GPPS).

The afore-mentioned transparent polymer blends have in particular the disadvantage that their multi-axial toughness and given stiffness and as a result the thermoforming behavior is still not satisfying. Furthermore blends of the prior art having sufficient toughness are more or less hazy and do not fulfill demanding optical requirements.

It is one object of the present invention to provide polymer blends with an improved multi-axial toughness, in particular an improved thermoforming behavior, and which simultaneously have high transparency.

It was found that this object is achieved by the polymer blend according to the invention. The invention provides a polymer blend comprising (or consisting of) the components:

A) 95 to 100%, in particular 95 to 99.9% by weight of a component A), consisting of polymers A1) to A4):
- A1) 50 to 75% by weight of at least one star shaped block copolymer A1 which comprises at least 2 terminal hard blocks S consisting of vinylaromatic monomers, in particular styrene, and comprises one or more soft blocks B in each case consisting of 98 to 100% by weight, preferably 100% by weight, of diene, in particular 1,3- butadiene, and from 0 to 2% by weight, vinyl aromatic monomers, in particular styrene, where the proportion by weight of the hard blocks S in the block copolymer A1 is from 65 to 90% by weight, preferably from 70 to 80% by weight, and the number-average molecular weight Mn of at least one block S is in the range from 35000 to 200000 g/mol;
- A2) 5 to 15% by weight of at least one linear or star-shaped block copolymer A2 which comprises at least 2 terminal hard blocks S1 and S2 consisting of vinylaromatic monomers, in particular styrene, and comprises one or more random copolymer blocks (B/S) in each case consisting of from 20 to 60% by weight of vinylaromatic monomers, in particular styrene, and from 80 to 40% by weight of dienes, in particular 1,3-butadiene, where the proportion by weight of the hard blocks S1 and S2 in the block copolymer A2 is from 40 to 60% by weight; and wherein the number-average molecular weight Mn of blocks S1 is in the range from 35000 to 200000 g/mol, preferably 50000 to 150000, and Mn of blocks S2 is in the range from 5000 to 30000 g/mol and the molar S1/S2 ratio is in the range from 1:0.5 to 1:10;
- A3) 3 to 10% by weight of at least one elastomeric star-shaped or linear block copolymer A3 which has been built up from hard blocks S made from vinylaromatic monomers, in particular styrene, and from one or more random soft blocks B/S consisting of from 60 to 30% by weight of vinylaromatic monomers, in particular styrene, and from 40 to 70% by weight of dienes, in particular 1,3-butadiene, and which contains at least the block sequence S-B/S, where the diene content is less than 50% by weight and the proportion of the soft phase formed from the blocks B/S is at least 60% by weight, based in each case on the entire block copolymer; and
- A4) 10 to 35% by weight of at least one general purpose polystyrene A4;

whereby the weight ratio of polymers A1) to A2) to A3) is from 7 : [1.2 to 1.9] : [0.5 to 1.2], and the sum of polymers A1) to A4) totals 100% by weight; and B) 0 to 5%, in particular 0.1 to 5%, by weight of additives, whereby the sum of the component A) and, if present, B), totals 100% by weight.

In one embodiment of the invention, the polymer blend is used, wherein the weight ratio of A1) to A2) to A3) is 7: 1.7: 1.

In one embodiment, the polymer blend is used, wherein component A) consists of from 50 to 70% by weight of A1), from 5 to 15% by weight of A2), and from 3 to 10% by weight of A3) and from 10 to 30% by weight of A4).

In one embodiment, the polymer blend is used, wherein component A) consists of from 50 to 70% by weight of A1), from 8 to 15% by weight of A2), and from 5 to 10% by weight of A3) and from 12 to 30% by weight of A4).

In one embodiment, the polymer blend is used, wherein component A) consists of 53 to 57% by weight of A1), from 10 to 15% by weight of A2), and from 5 to 10% by weight of A3) and from 20 to 30% by weight of A4).

In one embodiment, the polymer blend is used, wherein block copolymer A1) comprises at least 2 terminal hard blocks S (S1, S2 etc.) with different molecular weight, wherein the number-average molecular weight Mn of blocks S1 is in the range from 35000 to 200000, preferably 50000 to 150000, and Mn of blocks S2 is in the range from 5000 to 30000 g/mol and the molar S1/S2 ratio is generally in the range from 1:0.5 to 1:10, preferably in the range from 1:1 to 1:6.

In one embodiment, the polymer blend is used, wherein block copolymer A2) consists of from 60 to 90% by weight of vinylaromatic monomers and from 10 to 40% by weight of diene, based on the entire block copolymer.

In one embodiment, the polymer blend is used, wherein block copolymer A2) comprises at least 2 random soft blocks $(B/S)_1$ and $(B/S)_2$ having different proportions of vinyl aromatic monomers.

In one embodiment, the polymer blend is used, wherein block copolymer A2) is star-shaped and has a structure in which at least one arm of the star has a block sequence S1-(B/S) and one arm of the star has the block sequence S2-(B/S), or those in which at least one arm of the star has the block sequence S1-(B/S)-S3 and at least one arm of the star has the block sequence S2-(B/S)-S3 wherein S3 is another hard block made from the vinyl aromatic monomers.

In one embodiment, the polymer blend is used, wherein star-shaped block copolymer A2 has a structure in which at least one arm of the star has a block sequence S1-$(B/S)_1$-$(B/S)_2$ and at least one arm of the star has the block sequence S2-$(B/S)_1$-$(B/S)_2$ or in which at least one arm of the star has the block sequence S1-$(B/S)_1$-$(B/S)_2$-S3 and at least one arm of the star has the block sequence S2-$(B/S)_1$-$(B/S)_2$-S3 and wherein the molar ratio of vinyl aromatic monomer to diene S/B in the block $(B/S)_1$ is from 0.5 to 2 and in the block $(B/S)_2$ is below 0.5.

In one embodiment, the polymer blend is used, wherein block copolymer A3) consists of hard blocks S made from vinylaromatic monomers and one or more random soft blocks B/S consisting of from 50 to 30% by weight of vinylaromatic monomers and from 50 to 70% by weight of dienes, and which contains at least the block sequence S-B/S, where the proportion by weight of the diene in the entire block copolymer is from 25 to 50% by weight, and that of the vinylaromatic component is from 75 to 50% by weight.

In one embodiment, the polymer blend is used, wherein block copolymer A3) has at least one of the following structures:

S-B/S-S, X-[-B/S-S]$_2$, Y-[-B/S-S]$_2$, Y[(B/S-S)$_n$]$_m$[S]$_l$, and Y[(S-B/S)$_n$-S]$_m$[S]$_l$;

where S is the vinylaromatic hard block, B/S is the soft phase, X is the radical of an n-functional initiator, Y is the radical of an m– or (m+l)-functional coupling agent and m, n and l are natural numbers from 1 to 10.

In one embodiment, the polymer blend is used, wherein block copolymer A3) has a soft block B/S which has been subdivided into more than one block $(B/S)_n$ of identical make-up.

In one embodiment, the polymer blend is used, wherein block copolymer A3) is a linear block copolymer A3) where the vinylaromatic content of the S/B-blocks adjacent to the S-blocks is lower than in other S/B-blocks.

In one embodiment, the polymer blend is used, wherein block copolymer A3) is a linear block copolymer of the general structure S-(B/S)-S having, situated between the two S blocks, one or more (B/S)-random blocks having random vinylaromatic monomer/diene distribution and a 1,2-vinyl content in the copolymer block (B/S) of below 20%.

In one embodiment, the polymer blend is used together with 0.2 to 1% by weight (based on the total blend of A and B) of stabilizers and/or 0.5 to 3% by weight (based on the total blend of A and B) of processing aids.

The invention also relates to the use of a polymer blend as described above for the production of thermoforming films or blister pack films.

The invention also relates to a process for preparing of a polymer blend as described, comprising the step of mixing the components A1) to A4) and optionally B. The invention also relates to a process for preparing of a polymer blend as described, comprising the step of mixing the polymer components A1) to A4) and mixing 0.2 to 1% by weight (based on the total blend of A and B) of stabilizers and/or 0.5 to 3% by weight (based on the total blend of A and B) of processing aids.

The polymer blends preferably consists of component A) and, if present, B).

Component A) of the polymer blend preferably consists of from 50 to 70% by weight of A1), from 5 to 15% by weight of A2), and from 3 to 10% by weight of A3) and from 10 to 30% by weight of A4), whereby the weight ratio of A1) to A2) to A3) is 7:[1.2 to 1.9]:[0.5 to 1.2], preferably 7:1.7:1, and the sum of A1) to A4) totals 100% by weight.

Component A) of the polymer blend more preferably consists of from 50 to 70% by weight of A1), from 8 to 15% by weight of A2), and from 5 to 10% by weight of A3) and from 12 to 30% by weight of A4), whereby the weight ratio of A1) to A2) to A3) is 7:[1.2 to 1.9]:[0.5 to 1.2], preferably 7:1.7:1, and the sum of A1) to A4) totals 100% by weight.

Component A) of the polymer blend most preferably consists of from 50 to 70% by weight of A1), from 8 to 15% by weight of A2), and from 5 to 10% by weight of A3) and from 20 to 30% by weight of A4), whereby the weight ratio of A1) to A2) to A3) is 7:[1.2 to 1.9]:[0.5 to 1.2], preferably 7:1.7:1, and the sum of A1) to A4) totals 100% by weight.

According to a preferred embodiment component A) of the polymer blend preferably consists of 50 to 52% by weight of A1), from 12 to 15% by weight of A2), and from 7 to 10% by weight of A3) and from 25 to 30% by weight of A4), whereby the weight ratio of A1) to A2) to A3) is 7:1.7:1, and the sum of A1) to A4) totals 100% by weight.

According to a preferred embodiment component A) of the polymer blend preferably consists of 53 to 57% by weight of A1), from 10 to 15% by weight of A2), and from 5 to 10% by weight of A3) and from 20 to 30% by weight of A4), whereby the weight ratio of A1) to A2) to A3) is 7:1.7:1, and the sum of A1) to A4) totals 100% by weight.

A preferred embodiment component A) consists of from 53 to 57% by weight of A1), from 10 to 12% by weight of A2), and from 5 to 7% by weight of A3) and from 25 to 30% by weight of A4). A further preferred embodiment component A) consists of from 53 to 57% by weight of A1), from 13 to 15% by weight of A2), and from 7 to 10% by weight of A3) and from 20 to 25% by weight of A4).

According to a third preferred embodiment component A) of the inventive polymer blend consists of from 58 to 62% by weight of A1), from 10 to 15% by weight of A2), and from 5 to 10% by weight of A3) and from 15 to 25% by weight of A4), whereby the weight ratio of A1) to A2) to A3) is 7:1.7:1, and the sum of A1) to A4) totals 100% by weight. More preferred according to said third preferred embodiment component A) consists of from 58 to 62% by weight of A1), from 10 to 12% by weight of A2), and from 5 to 7% by weight of A3) and from 20 to 25% by weight of A4).

According to a fourth preferred embodiment component A) of the inventive polymer blend consists of from 63 to 67% by weight of A1), from 7 to 15% by weight of A2), and from 5 to 7% by weight of A3) and from 15 to 21% by weight of A4), whereby the weight ratio of A1) to A2) to A3) is 7:1.7:1, and the sum of A1) to A4) totals 100% by weight.

More preferred according to said fourth preferred embodiment component A) consists of from 63 to 67% by weight of A1), from 10 to 12% by weight of A2), and from 5 to 7% by weight of A3) and from 15 to 20% by weight of A4).

According to a fifth preferred embodiment component A) of the inventive polymer blend consists of from 68 to 70% by weight of A1), from 7 to 13% by weight of A2), and from 5 to 7% by weight of A3) and from 12 to 17% by weight of A4), whereby the weight ratio of A1) to A2) to A3) is 7:1.7:1, and the sum of A1) to A4) totals 100% by weight. More preferred according to said fifth preferred embodiment component A) consists of from 68 to 70% by weight of A1), from 10 to 12% by weight of A2), and from 5 to 7% by weight of A3) and from 12 to 15% by weight of A4).

If in a blend of the afore-mentioned composition, the polystyrene content is less than 10% by weight, such a polymer blend would become too soft. If the polystyrene content exceeds 35% by weight, the transparency drops and the blends become too brittle.

The polymer blend can also comprise from 0.1 to 5% by weight of additives B), in particular conventional auxiliaries for polymer blends. The polymer blend often comprises 0.2 to 1% by weight (based on the total blend of A and B) of stabilizers and 0.5 to 3% by weight (based on the total blend of A and B) of processing aids.

Block Copolymer A1

Preferred are star shaped block copolymers A1 comprising or preferably consisting of at least 2 terminal hard blocks S (S1, S2 etc.) with different molecular weight consisting of vinylaromatic monomers, in particular styrene, and one or more soft blocks B consisting of 98 to 100% by weight, preferably 100% by weight, of dienes, in particular 1,3-butadiene, and from 0 to 2% by weight, vinyl aromatic monomers, in particular styrene, where the proportion by weight of the hard blocks S in the block copolymer A1 is from 65 to 90% by weight, preferably from 70 to 80% by weight, and the number-average molecular weight Mn of at least one block S is in the range from 35000 to 200000 g/mol;

More preferred are star shaped block copolymers Al, comprising or preferably consisting of at least 2 terminal hard blocks S (S1, S2 etc.) with different molecular weight, composed of vinylaromatic monomers, in particular styrene, and one or more soft blocks B consisting of 98 to 100% by weight, preferably 100% by weight, of dienes, in particular 1,3-butadiene, and from 0 to 2% by weight, vinyl aromatic monomers, in particular styrene, where the proportion by weight of the hard blocks S in the block copolymer A1 is from 65 to 90% by weight, preferably from 70 to 80% by weight, and wherein the number-average molecular weight Mn of blocks S1 is in the range from 35000 to 200000, preferably 50000 to 150000, and Mn of blocks S2 is in the range from 5000 to 30000 g/mol and the molar S1/S2 ratio is generally in the range from 1:0.5 to 1:10, preferably in the range from 1:1 to 1:6.

The at least 2 terminal hard blocks S with different molecular weight are designated as blocks S1, S2 etc.

Vinyl aromatic monomers which may be used for the hard blocks S1 and S2 are styrene, a-methylstyrene, p-methylstyrene, ethylstyrene, tert-butylstyrene, vinyl toluene or mixtures of these, preferably styrene.

Preferred dienes for the soft block B are butadiene, isoprene, 2,3-dimethylbutadiene, 1,3-pentadiene, 1,3-hexadienes or piperylene or mixtures of these, particularly preferably 1,3-butadiene.

The glass transition temperature of the soft block B is preferably in the range from −70 to −100° C. The glass transition temperature is affected by the 1,2-vinyl content of the diene units and can be determined via Differential Scanning calorimetry (DSC) or Differential Thermal Analysis (DTA).

The block copolymer A1 can, by way of example, be prepared via sequential anionic polymerization using alkyl-lithium compounds such as n-butyllithium or sec-butyllithium, and, in case of n-butyllithium, tetrahydrofuran in low amounts of less than 0.02 volume % based on the solvent (e.g. cyclohexane) is recommended to ensure complete initiation and narrow molar mass distributions of the styrene blocks.

Block copolymer A1 is generally a star polymer of the structure [S-B]nX, having n arms of the star, these being obtainable via coupling, using an n-functional coupling agent X. An example of a suitable coupling agent is epoxidized vegetable oil, such as epoxidized linseed oil or epoxidized soybean oil. In this instance, stars having from 3 to 5 arms are obtained. If according to the afore-mentioned preferred embodiments the star shaped block copolymer A1 comprises or preferably consists of at least 2 terminal hard blocks S (S1, S2 etc.) with different molecular weight, then a statistical mixture of symmetrical and non-symmetrical star polymers is obtained.

The number-average molecular weight Mn of the soft block B is generally in the range from 20 000 to 80 000 g/mol. The blocks S1, S2 etc. are preferably consisting of styrene units. In the case of the anionically prepared polymers, the molecular weight is controlled by way of the ratio of amount of monomer to amount of initiator. Preferably the initiator is added more than once after monomer feed has taken place, the result then being a bi- or multimodal distribution.

Suitable block copolymers A1 are commercially available as Styrolux(R) 3G 33, Styroclear® GH 62, and K-Resin® grades 01, 03, 04, or 05 (commercial products of Styrolution, Germany).

Block Copolymer A2

Preferred are linear or preferably star-shaped block copolymers A2 comprising or preferably consisting of at least 2 terminal hard blocks S1 and S2 consisting of vinylaromatic monomers, in particular styrene, and at least one random soft block B/S, consisting of from 20 to 60% by weight of vinylaromatic monomers, in particular styrene, and from 80 to 40% by weight of dienes, in particular 1,3-butadiene, where the proportion of the hard blocks is from 40 to 60% by weight, based on the total block copolymer; and wherein the number-average molecular weight Mn of blocks S1 is in the range from 50000 to 150000, and Mn of blocks S2 is in the range from 5000 to 30000 g/mol and the molar S1/S2 ratio is in the range from 1:1.5 to 1:3.5, in particular 1:2.5.

Vinyl aromatic monomers which may be used for the hard blocks S1 and S2 or else for the soft blocks B/S are styrene, a-methylstyrene, p-methylstyrene, ethylstyrene, tertbutylstyrene, vinyl toluene or mixtures of these, preferably styrene.

Preferred dienes for the soft block B/S are butadiene, isoprene, 2,3-dimethylbutadiene, 1,3-pentadiene, 1,3-hexadienes or piperylene or mixtures of these, particularly preferably 1,3-butadiene.

Particularly suitable block copolymers A2 are stiff block copolymers consisting of from 60 to 90% by weight of vinylaromatic monomers and from 10 to 40% by weight of diene, based on the entire block copolymer, and consisting of hard blocks S mainly comprising vinylaromatic monomers, in particular styrene, and of random copolymer soft blocks (B/S) comprising dienes, such as butadiene and isoprene, in particular 1,3-butadiene. Block copolymers A2 having from 70 to 80% by weight of vinylaromatic monomers, in particular styrene, and from 20 to 30% by weight of diene, in particular 1,3-butadiene, based on the entire block copolymer, are particularly preferred.

The number-average molecular weight Mn of the soft blocks (B/S) of the block copolymer A2 is preferably from 50 000 to 150 000 g/mol, and its glass transition temperature Tg is preferably in the range from −65° to 0° C.

The copolymer blocks (B/S) of the block copolymer A2 have random distribution of the vinylaromatic monomers and dienes.

Preferred block copolymers A2 have a star-shaped structure.

Linear structures of block copolymers A2 are also possible, for example S1-(B/S)-S2.

Particular preference is given to the block copolymers A2 described in WO 00/58380, having at least two terminal hard blocks S1 and S2 composed of vinylaromatic monomers and, between these, at least one random soft block (B/S) composed of vinylaromatic monomers and dienes, where the proportion of the hard blocks is from 40 to 60% by weight, based on the entire block copolymer, and the 1,2-vinyl content in the soft block (B/S) is below 20%.

The vinyl content is the relative proportion of 1,2 linkages of the diene units based on the total of 1,2, 1,4-cis and 1,4-trans linkages. The 1,2-vinyl content of the soft blocks is preferably from 8 to 19%, in particular from 8 to 16%.

The block copolymer A2 preferably consists exclusively of terminal hard blocks S1 and S2 and also of at least one random soft block B/S, and does not contain any homopolydiene blocks B.

Between the hard blocks S1 and S2 there may also be more than one random soft block B/S. Preference is given to at least 2 random soft blocks $(B/S)_1$ and $(B/S)_2$ having different proportions of vinyl aromatic monomers and therefore different glass transition temperatures. The block copolymers may have a linear or star-shaped structure. Such a linear block copolymer A2 used preferably has the structure $S1-(B/S)_1-(B/S)_2-S2$ where the molar ratio of vinyl aromatic monomer to diene S/B in the block $(B/S)_1$ is preferably below 0.25 and in the block $(B/S)_2$ preferably from 0.5 to 2.

The star-shaped block copolymers A2 used in particular preferably have a structure in which at least one arm of the star has a block sequence S1-(B/S) and one arm of the star has the block sequence S2-(B/S), or those in which at least one arm of the star has the block sequence S1-(B/S)-S3 and at least one arm of the star has the block sequence S2-(B/S)-S3. S3 here is another hard block made from the vinyl aromatic monomers mentioned.

Most preferred for star-shaped block copolymers A2 are structures in which at least one arm of the star has a block sequence $S1-(B/S)_1-(B/S)_2$ and at least one arm of the star has the block sequence $S2-(B/S)_1(B/S)_2$ or those in which at least one arm of the star has the block sequence $S1-(B/S)_1 (B/S)_2-S3$ and at least one arm of the star has the block sequence $S2-(B/S)_1(B/S)_2-S3$. The molar ratio of vinyl aromatic monomer to diene S/B in the block $(B/S)_1$ is preferably from 0.5 to 2 and in the block $(B/S)_2$ is preferably below 0.5.

Suitable block copolymers A2 are also commercially available as Styrolux® 3G 55.

Block Copolymer A3)

Preferred are elastomeric star-shaped or linear block copolymers A3) comprising or preferably consisting of hard blocks S made from vinylaromatic monomers, in particular styrene, and one or more random soft blocks B/S consisting of from 50 to 30% by weight of vinylaromatic monomers, in particular styrene, and from 50 to 70% by weight of dienes, in particular 1,3-butadiene, and which contains at least the block sequence S-B/S, where the diene content is up to 50% by weight and the proportion of the soft phase formed from the blocks B/S is at least 60% by weight, based in each case on the entire block copolymer.

Preferred are the afore-mentioned block copolymers A3) where the proportion by weight of the diene, preferably 1,3-butadiene, in the entire block copolymer is from 25 to 50% by weight, and that of the vinylaromatic component, preferably styrene, is correspondingly from 75 to 50% by weight.

Particular preference is given to the afore-mentioned block copolymers A3), in particular butadiene-styrene block copolymers, with a monomer content of from 30 to 40% by weight of diene and from 70 to 60% by weight of vinylaromatic compounds.

According to the invention, the proportion by weight of the soft phase of the block copolymer A3) is built up from diene sequences and vinylaromatic sequences is from 60 to 95% by weight, preferably from 60 to 80% by weight, and particularly preferably from 65 to 75% by weight.

The blocks S produced from the vinylaromatic monomers form the hard phase, the proportion by weight of which is correspondingly 5 to 40% by weight, preferably from 20 to 40% by weight and particularly preferably from 25 to 35% by weight.

The vinyl content is the relative proportion of 1,2-linkages of the diene units, based on the sum of 1,2-vinyl, 1,4-cis and 1,4-trans linkages. The 1,2-vinyl content in the random copolymer soft block (S/B) of block copolymer A3) is preferably below 20%, in particular in the range from 9 to 15%, particularly preferably in the range from 9 to 12%.

Preferred vinylaromatic compounds used for block copolymers A3) are preferably styrene and also α-methylstyrene and vinyltoluene, and also mixtures of these compounds.

Preferred dienes used for block copolymers A3) are preferably 1,3-butadiene or isoprene, and also piperylene, 1-phenylbutadiene and mixtures of these compounds, in particular preferred is 1,3-butadiene.

A particularly preferred monomer combination is 1,3-butadiene and styrene.

The glass transition temperature (Tg) of the soft block B/S is generally from −50 to +0° C., preferably from −50 to −20° C.

The glass transition temperature (Tg) of the hard block S is preferably above 25° C., particularly preferably above 50° C.

The number average molecular weight Mn of a block S is preferably from 10000 to 50000 g/mol. It is particularly preferable for the number average molecular weight of a block S to be from 15000 to 30000 g/mol. Blocks S within a molecule may have various molecular weights.

The number average molecular weight Mn of the block B/S is usually from 30000 to 200000 g/mol and preferably from 50000 to 150000 g/mol.

Block B/S, like block S, may assume various molecular weights within a molecule.

Block copolymer A3) can be presented, for example, by one of the formulae 1 to 12:

(1)

(2)

(3)

$$B/S\text{-}(S\text{-}B/S)_n; \quad (4)$$

$$X\text{-}[(S\text{-}B/S)_n]_{m+1}; \quad (5)$$

$$X\text{-}[(B/S\text{-}S)_n]_{m+1}; \quad (6)$$

$$X\text{-}[(S\text{-}B/S)_n\text{-}S]_{m+1}; \quad (7)$$

$$X\text{-}[(B/S\text{-}S)_n\text{-}B/S]_{m+1}; \quad (8)$$

$$Y\text{-}[(S\text{-}B/S)_n]_{m+1}; \quad (9)$$

$$Y\text{-}[(B/S\text{-}S)_n]_{m+1}; \quad (10)$$

$$Y\text{-}[(S\text{-}B/S)_n\text{-}S]_{m+1}; \quad (11)$$

$$Y\text{-}[(B/S\text{-}S)_n\text{-}B/S]_{m+1}; \quad (12)$$

$$Y[(B/S\text{-}S)_n]_m[S]_l; \quad (13)$$

$$Y[(S\text{-}B/S)_n\text{-}S]_m[S]_l; \quad (14)$$

where S is the vinylaromatic block and B/S is the soft phase, ie. the block built up randomly from diene units and vinylaromatic units, X is the radical of an n-functional initiator, Y is the radical of an m– or (m +1)-functional coupling agent and m, n and l are natural numbers from 1 to 10.

Preferred polymer structures are S-B/S-S, X-[-B/S-S]$_2$ and Y-[-B/S-S]$_2$.

The random block B/S may itself again be subdivided into blocks (B/S)$_1$-(B/S)$_2$-(B/S)$_3$- . The random block is preferably composed of from 2 to 15 random sub-blocks, particularly preferably from 3 to 10 sub-blocks. Dividing the random block B/S into very many sub-blocks (B/S)$_n$ has the important advantage that the B/S block overall behaves as an almost perfect random polymer even if there is a minor gradient in its make-up within a sub-block (B/S)$_n$, as is difficult to avoid in anionic polymerization under industrial conditions (see below).

The soft phase may be subdivided into blocks (B/S)$_1$-(B/S)$_2$, where the indices 1 and 2 represent different structures in the sense that the vinylaromatic/diene ratio is different in the individual blocks B/S or changes continuously within a block within the limits (B/S)$_1$(B/S)$_2$, where the glass transition temperature Tg of each sub-block is less than 0° C.

Particular preference is given to a soft block B/S which has been subdivided into more than one block (B/S)$_n$ of identical make-up.

In particular preferred are also linear block copolymers A3) where the vinylaromatic content of the S/B-blocks adjacent to the S-blocks is lower than in other S/B-blocks.

Preference is also given to a block copolymer A3) which has, in each molecule, more than one block B/S and/or S with different molecular weight.

Further preferred block copolymers A3) have a star-shaped molecular architecture, where the star-shaped molecular architecture has at least two different arms of the star, having the structure one of the following general formulae:

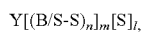

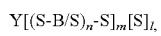

where S, B/S, n, and m have the meaning given above Y is the moiety of an (m+l)-functional coupling agent, and l is a natural number from 1 to 10. Said star shaped block copolymers A are described in detail in WO 2012/055919.

In particular preferred is a linear block copolymer A3) of the formulae S-B/S-S, where S is a vinylaromatic, in particular styrene, block and B/S is the soft phase made from one or more blocks B/S built up randomly from diene units and vinylaromatic units, in particular styrene/butadiene units.

Very particular preferred block copolymers A3) used in the present invention are linear block copolymers, in particular linear styrene-butadiene block copolymers, of the general structure S-(B/S)-S having, situated between the two S blocks, one or more (B/S)—random blocks having random vinylaromatic monomer/diene distribution, in particular styrene/butadiene distribution, and a 1,2-vinyl content in the copolymer block (B/S) of below 20%.

The afore-mentioned linear styrene-butadiene block copolymers are commercially available as Styroflex® 2G 66 from Styrolution (Frankfurt, Germany).

The block copolymers A3) are obtainable by anionic polymerization in a non-polar solvent with addition of a polar cosolvent or preferentially of a potassium salt, as described, for example, in WO 96/20248 or WO 97/40079.

General Purpose Polystyrene A4)

The preparation, structure and properties of general purpose polystyrene (GPPS) has been described in detail in the review literature (Kunststoffhandbuch, Vol. 4, Polystyrol, Carl Hanser Verlag (1996)). The weight average molecular weight Mw is preferably in the range of from 230000 to 320000 g/mol, more preferably in the range of from 260000 to 280000 g/mol. The polydispersity index D ($M_w/M_n$) is in general 2 to 4, preferably 2.2 to 3. The weight average molecular weight Mw and the polydispersity index D can be determined by methods known to the polystyrene chemist.

Suitable general purpose polystyrene is prepared by the anionic or free-radical polymerization process. The polymer's inhomogeneity, which can be affected by the polymerization process, is of subordinate significance here.

Additives B)

The polymer blends may comprise, as component B) from 0.1 to 5% by weight of usual additives, such as processing aids, stabilizers, in particularly oxidation inhibitors, ultra-violet light blockers, lubricants, mold-release agents, colorants, preferably such which are not scattering light.

Examples of oxidation inhibitors and heat stabilizers are sterically hindered phenols, various substituted representatives of these groups and mixtures thereof in concentrations of up to 1% by weight, based on the weight of the entire polymer blend.

UV stabilizers which may be mentioned, and are generally used in amounts of up to 2% by weight, based on the entire polymer blend, are various substituted resorcinols, salicylates, benzotriazoles and benzophenones.

Examples of mold-release agents and lubricants, which may generally be used in amounts of up to 1% by weight, are long-chain fatty acids, such as stearic acid or behenic acid, salts of these (e.g. calcium stearate or zinc stearate) or esters (e.g. stearyl stearate or pentaerythritol tetrastearate) and also amide derivatives (e.g. ethylenebis-stearylamide).

An example of a processing aid, which can be used in amounts from 0.1 to 5% by weight, preferably from 0.5 to 3% by weight, is a homogeneously miscible oil or oil mixture, in particular medical grade mineral oil.

The novel polymer blends may be prepared by processes known per se.

Extruders with kneading elements, preferably twin-screw extruders, or other conventional kneading apparatuses, such as Brabender mixers or Banbury mixers, may be used for the preparation of the polymer blend. Said kneading elements ensure sufficient homogenization of the components guaranteeing micromixing.

The polymer blends of the invention are highly transparent and suitable for the production of thermoforming films, which demand a combination of high transparency and gloss with high stiffness and adequate toughness, or blister-pack films.

The following examples and claims further describe the invention:

EXAMPLES

The Melt Mass Flow Rate (MFR) or Melt Flow Index (MFI) has been determined according to ISO 1133-1:2011-12 at 200° C. with a load of 5 kg.

Block Copolymer A1

Styrolux® 3G 33 from Styrolution (Frankfurt, Germany), a star shaped SBS (Styrene Butadiene Styrene) block copolymer, the amount of butadiene in the total block copolymer is 26% by weight and that of styrene is 74% by weight, MFR: 15 (200° C/5 kg) g/10 min Block Copolymer A2

Styrolux° 3G 55 from Styrolution, a star shaped SBS (Styrene Butadiene Styrene) block copolymer, the amount of butadiene in the total block copolymer is 26% by weight and that of styrene is 74% by weight, MFR: 15 (200° C/5 kg) g/10 min Block Copolymer A3

Styroflex® 2G 66 from Styrolution, a linear styrene-butadiene triblock copolymer of the structure S-(S/B)-S, the amount of the monomers in the total block copolymer is 35% by weight of butadiene and 65% by weight of styrene; the weight ratio of the blocks is 16/68/16 ; MFI: 14 (200° C/5 kg) g/10 min.

General Purpose Polystyrene A4

General purpose polystyrene with a melt volume rate MFR (200° C/5 kg) of 3 cm³/10 min (Polystyrol 158 K from Styrolution, Germany).

Additives B

The afore-mentioned commercially available polymer components comprise mineral oil or fatty acid based processing aids (0-2%) and stabilizers (0.2-1%).

Preparation of the Blends and Film Production

The novel blends and in particular films made from polymers A1) to A4) in the proportions by weight given in Table 1 were produced in a twin screw extruder (screw diameter 16 mm, screw length 40 D, with melt temperature 200 to 220° C.) with an extrusion die (thickness 0.2 mm, length 10 cm) by the chill roll process with a roll temperature of 60° C.

Table 1 shows the composition (in % by weight) of the obtained polymer blend component A.

TABLE 1

| Example | A1) | A2) | A3) | A4) |
|---|---|---|---|---|
| 1 | 56 | 14 | 8 | 22 |

99.0% by weight of this component A can be mixed with 1.0% by weight of additives B and a thermoforming film can be obtained.

For example, 0.2% by weight (based on the total blend of A and B) of stabilizer (heat stabilizer) and 0.8% by weight (based on the total blend of A and B) of processing aid (mineral oil) can be used.

The invention claimed is:

1. A polymer blend comprising the components:
A) 95 to 100% by weight of a component A) consisting of polymers A1) to A4):
A1) 50 to 70% by weight of at least one star shaped block copolymer A1 which comprises at least 2 terminal hard blocks S consisting of vinylaromatic monomers, and comprises one or more soft blocks B in each case consisting of 98 to 100% by weight of diene, and from 0 to 2% by weight of vinyl aromatic monomers, where the proportion by weight of the hard blocks S in the block copolymer A1 is from 65 to 90% by weight and the number-average molecular weight Mn of at least one block S is in the range from 35000 to 200000 g/mol;
A2) 8 to 15% by weight of at least one linear or star-shaped block copolymer A2 which comprises at least 2 terminal hard blocks S1 and S2 consisting of vinylaromatic monomers and comprises one or more random copolymer blocks (B/S) in each case consisting of from 20 to 60% by weight of vinylaromatic monomers, and from 80 to 40% by weight of dienes, where the proportion by weight of the hard blocks S1 and S2 in the block copolymer A2 is from 40 to 60% by weight; and wherein the number-average molecular weight Mn of blocks S1 is in the range from 35000 to 200000 g/mol, and Mn of blocks S2 is in the range from 5000 to 30000 g/mol and the molar S1/S2 ratio is in the range from 1:0.5 to 1:10;
A3) 3 to 10% by weight of at least one elastomeric star-shaped or linear block copolymer A3 which has been built up from hard blocks S made from vinylaromatic monomers, and from one or more random soft blocks B/S consisting of from 60 to 30% by weight of vinylaromatic monomers, and from 40 to 70% by weight of dienes, and which contains at least the block sequence S-B/S, where the diene content is less than 50% by weight and the proportion of the soft phase formed from the blocks B/S is at least 60% by weight, based in each case on the entire block copolymer; and
A4) 10 to 30% by weight of at least one general purpose polystyrene A4;
whereby the weight ratio of polymers A1) to A2) to A3) is from 7:[1.2 to 1.9]:[0.5 to 1.2], and the sum of polymers A1) to A4) totals 100% by weight; and
B) 0 to 5% by weight of additives,
whereby the sum of the component A) and, if present, B), totals 100% by weight.

2. A polymer blend according to claim 1, wherein the weight ratio of A1) to A2) to A3) is 7:1.7:1.

3. A polymer blend according to claim 1, wherein component A) consists of from 50 to 70% by weight of A1), from 8 to 15% by weight of A2), and from 5 to 10% by weight of A3) and from 12 to 30% by weight of A4).

4. A polymer blend according to claim 1, wherein component A) consists of 53 to 57% by weight of A1), from 10 to 15% by weight of A2), and from 5 to 10% by weight of A3) and from 20 to 30% by weight of A4).

5. A polymer blend according to claim 1, wherein block copolymer A1) comprises at least 2 terminal hard blocks S with different molecular weight, wherein the number-average molecular weight Mn of blocks S1 is in the range from 35000 to 200000, and Mn of blocks S2 is in the range from 5000 to 30000 g/mol and the molar S1/S2 ratio is generally in the range from 1:0.5 to 1:10.

6. A polymer blend according to claim 1, wherein block copolymer A2) consists of from 60 to 90% by weight of vinylaromatic monomers and from 10 to 40% by weight of diene, based on the entire block copolymer.

7. A polymer blend according to claim 1, wherein block copolymer A2) comprises at least 2 random soft blocks $(B/S)_1$ and $(B/S)_2$ having different proportions of vinyl aromatic monomers.

8. A polymer blend according to claim 1, wherein block copolymer A2) is star-shaped and has a structure in which at least one arm of the star has a block sequence S1-(B/S) and one arm of the star has the block sequence S2-(B/S), or those in which at least one arm of the star has the block sequence S1-(B/S)-S3 and at least one arm of the star has the block sequence S2-(B/S)-S3 wherein S3 is another hard block made from the vinyl aromatic monomers.

9. A polymer blend according to claim 8, wherein star-shaped block copolymer A2 has a structure in which at least one arm of the star has a block sequence $S1-(B/S)_1-(B/S)_2$ and at least one arm of the star has the block sequence $S2-(B/S)_1-(B/S)_2$ or in which at least one arm of the star has the block sequence $S1-(B/S)_1-(B/S)_2-S3$ and at least one arm of the star has the block sequence $S2-(B/S)_1-(B/S)_2-S3$ and wherein the molar ratio of vinyl aromatic monomer to diene S/B in the block $(B/S)_1$ is from 0.5 to 2 and in the block $(B/S)_2$ is below 0.5.

10. A polymer blend according to claim 1, wherein block copolymer A3) consists of hard blocks S made from vinylaromatic monomers and one or more random soft blocks B/S consisting of from 50 to 30% by weight of vinylaromatic monomers and from 50 to 70% by weight of dienes, and which contains at least the block sequence S-B/S, where the proportion by weight of the diene in the entire block copolymer is from 25 to 50% by weight, and that of the vinylaromatic component is from 75 to 50% by weight.

11. A polymer blend according to claim 1 wherein block copolymer A3) has at least one of the following structures:
S-B/S-S, X-[-B/S-S]$_2$, Y-[-B/S-S]$_2$, Y[(B-S-S)$_n$]$_m$[S]$_l$ and Y[(S-B/S)$_n$-S]$_m$[S]$_l$;
where S is the vinylaromatic hard block, B/S is the soft phase, X is the radical of an n-functional initiator, Y is the radical of an m– or (m+l)-functional coupling agent and m, n and l are natural numbers from 1 to 10.

12. A polymer blend according to claim 1, wherein block copolymer A3) has a soft block B/S which has been subdivided into more than one block $(B/S)_n$ of identical make-up.

13. A polymer blend according to claim 1, wherein block copolymer A3) is a linear block copolymer A3) where the vinylaromatic content of the S/B-blocks adjacent to the S-blocks is lower than in other S/B-blocks.

14. A polymer blend according to claim 1, wherein block copolymer A3) is a linear block copolymer of the general structure S-(B/S)-S having, situated between the two S blocks, one or more (B/S)-random blocks having random vinylaromatic monomer/diene distribution and a 1,2-vinyl content in the copolymer block (B/S) of below 20%.

15. A method in which a polymer blend according to claim 1 is formed into thermoforming films or blister pack films.

16. A process for preparing of a polymer blend according to claim 1, comprising the step of mixing the components A1) to A4) and optionally B.

* * * * *